Sept. 13, 1932.    H. G. CRESS    1,876,619
EASEL BLACKBOARD
Filed April 8, 1930    2 Sheets-Sheet 1

Inventor
Horatio G. Cress
By his Attorney

Sept. 13, 1932.     H. G. CRESS     1,876,619
EASEL BLACKBOARD
Filed April 8, 1930     2 Sheets-Sheet 2
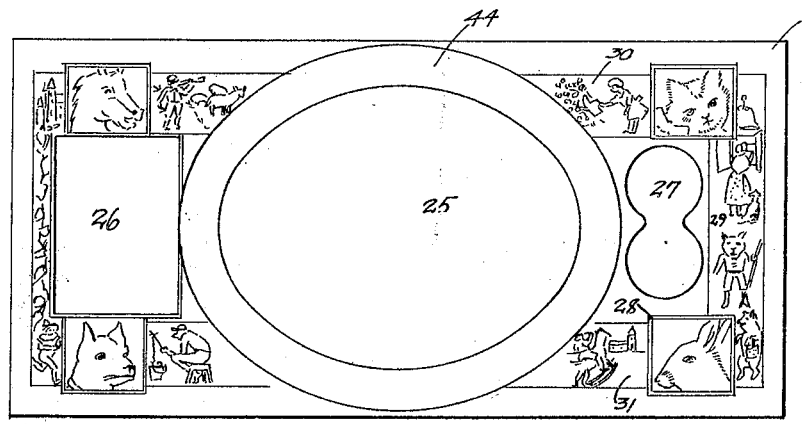
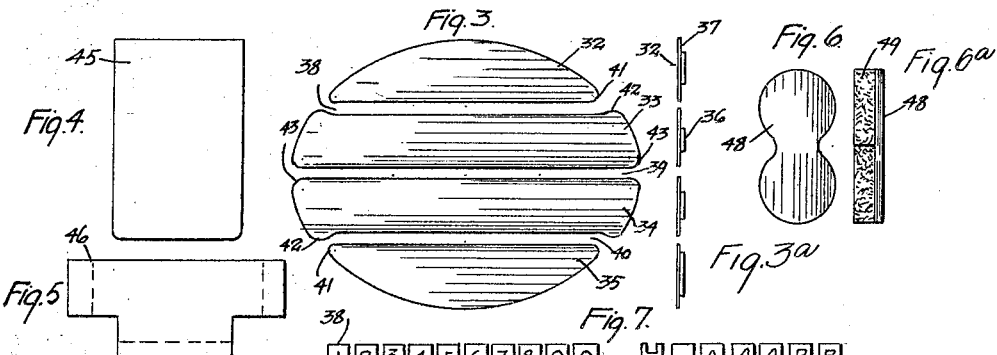
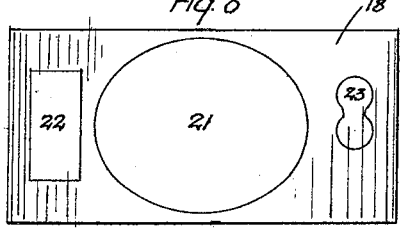
Fig. 8
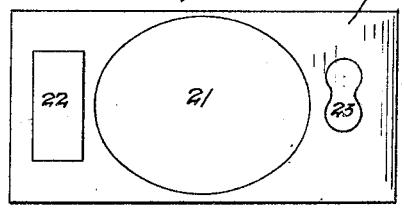
Fig. 9
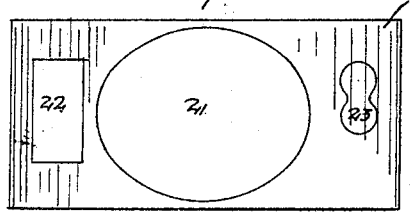
Fig. 10
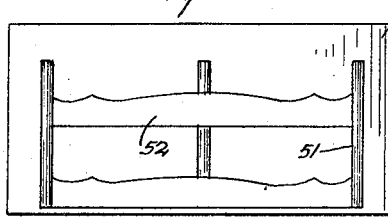
Fig. 11
Inventor
Horatio G. Cress
By his Attorney
George C. Heinick Patented Sept. 13, 1932

1,876,619

UNITED STATES PATENT OFFICE

HORATIO G. CRESS, OF TROY, OHIO

EASEL BLACKBOARD

Application filed April 8, 1930. Serial No. 442,523.

This invention relates to improvements in educational appliances as they are for instance disclosed by my Patent No. 1,541,795, of June 16, 1925, and No. 1,581,178 of April 20, 1926, and particularly to an easel blackboard, and it is the principal object of my invention to provide an easel having the upper part of its frame adapted for the guidance of double headed buttons bearing the letters of the alphabet and the cardinal numbers respectively and the passageways in which said buttons, preferably 48, are movable, are so constructed that the buttons can be moved smoothly without sticking or damage to the members forming the passageways.

Another object of my invention is the provision of an easel blackboard equipped with a plate serving as a desk plate and slate adapted to be readily set up for use in either capacity and having one side velvet finished while the opposite side is slated.

Still another object of my invention is the provision of an easel blackboard equipped with an upper front plate which is highly enameled and carries about the passageways for the buttons allegoric figures for lectures or serving as models for drawing while the buttons are used to compose any number or combination of numbers or legend for spelling and other purposes.

A further object of my invention is the provision of an easel blackboard for educational purposes equipped with a chalk pocket and fancy eraser or wiper.

A still further object of my invention is the provision of an easel educational board equipped with a shelf for holding sets of drawing cards or the like and which is brightly enameled in various harmonizing colors easy to be cleaned and kept sanitary.

These and other objects and advantages of my invention will become more fully known as the description thereof proceeds, and will then be specifically defined in the appended claims.

In the accompanying drawings forming a material part of this disclosure:

Fig. 2 is a front elevation of the upper part of the device.

Fig. 3 is a front elevation of the guides for the letter buttons. Fig. 3ª is an end elevation thereof.

Fig. 4 is a front elevation of a flap for covering a chalk pocket.

Fig. 5 is a front elevation of the chalk pocket.

Fig. 6 is a front elevation of a wiper or eraser. Fig. 6ª is an end elevation thereof.

Fig. 7 are detail views of buttons used with my device and bearing the letters of the alphabet and the cardinal numbers.

Figure 1:
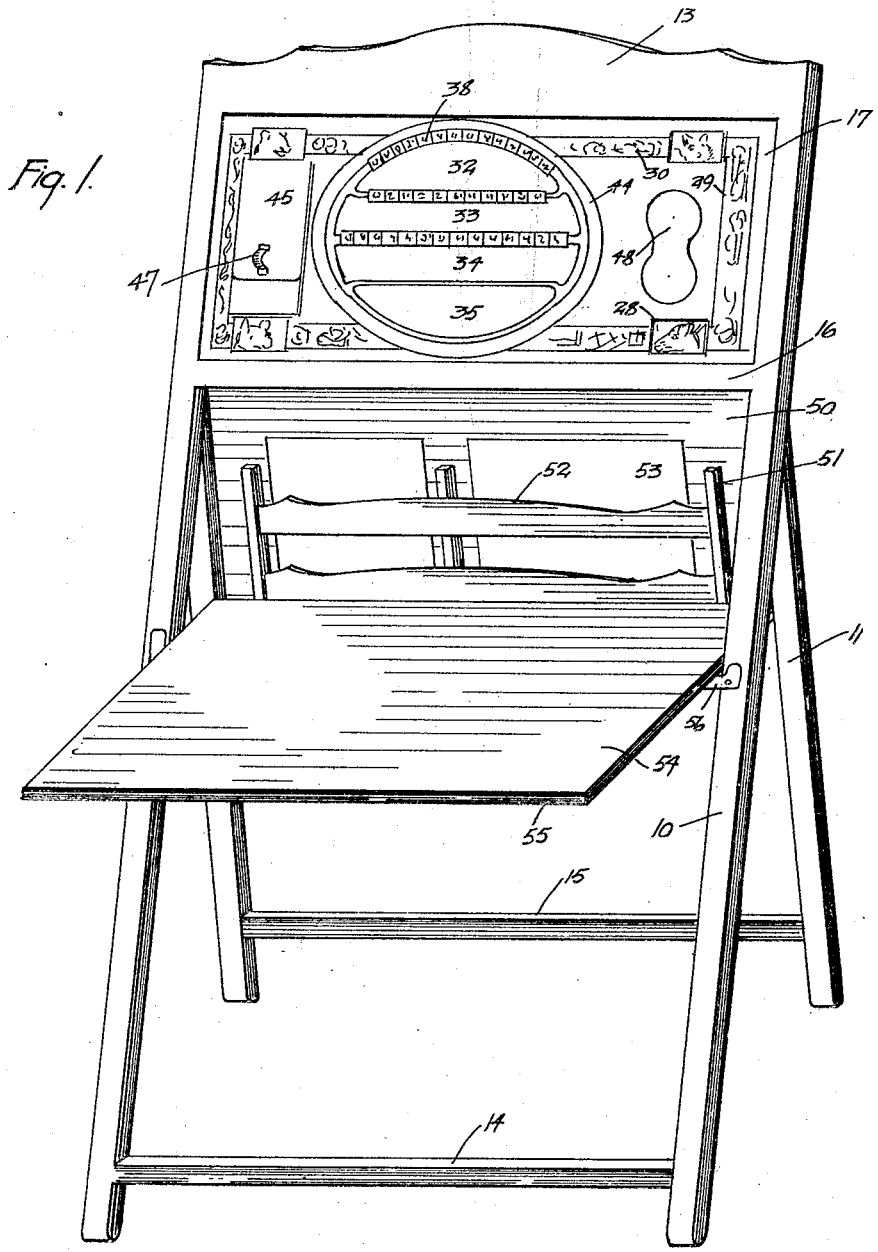
Fig. 1 is a perspective view of an easel blackboard constructed according to my invention.

Figs. 8, 9, and 10, are front, end elevations of the various parts or sections which combined represent the upper or guide part for the buttons.

Fig. 11 is a front elevation of the paper and book shelf.

As illustrated, the easel blackboard according to my invention comprises a front frame 10, and a rear frame 11 hinged to the rear face of frame intermediate the ends thereof, as at 12. An upper bar 13 connects the upper ends of frame bars 10, while braces 14 and 15 connect the front and rear legs of frames 10 and 11 separately. Between the upper frame bar 13 and an intermediate cross bar 16 the easel carries a ground plate 17 to which are pasted or otherwise secured in their successive order plates 18, 19, and 20, (Figs. 8, 9 and 10), each containing a median oval or elliptical opening 21, a square opening 22 at one side thereof, and a substantially 8-shaped opening 23 at the other side of said median opening. A front plate 24 has a median opening 25 and square opening 26 and a substantially 8-shaped opening 27 at the sides of opening 25, and is pasted on plate 20, so that pockets are formed by the overlapping plates.

The openings are surrounded by allegoric figures of animals in squares 28, and lateral, upper and lower panels 29, 30, 31.

In the median oval opening 25, filler members 32, 33, 34 and 35 are pasted to plate 20 by means of their rear cleats 36 which leave the margins 37 on the members projecting beyond the cleats to form inner guideways for the buttons 38. It will be seen on the drawings that the turn or curve from the parallel straight lines channel between members 33 and 34 to the outer or oval channel is such as to meet the outer oval channel at almost a right angle in order to allow a movement of the blocks in a narrow channel so that when sitting in an upright or almost upright position, as part of the easel blackboard, the blocks will pass in or out of the curve without locking. And this I consider the most vital part of my invention.

The outer edges of each two adjoining members are separated to leave passageways 38, 39, and 40 respectively and the outer lower ends of the edges of member 32 and inner upper edges of member 33 and the lower end edges of member 34 have rounded shoulders 42 formed therewith.

The oppositely disposed end edges of the adjoining members 33, 34, forming the median passageway 39 are cut away, as at 43. Thus passageways and connections between the same and the edges of the oval frame 44 for the buttons 38 are formed which allow a smooth convenient and free movement of the buttons in their desired proper order to form any desired legend and prevent a sticking of the buttons at the turns or damage to the members 32, 33, 34 and 35.

The openings 26 and 27 in the superposed plates form pockets for the reception of a plurality of pieces of vari-colored chalk in opening 26 which is closed by flap of flexible material glued or otherwise secured along its upper edge to the wall in front plate 24 forming opening 26, the lower, free edge of said flap adapted to be engaged into a pocket formed from blank 46 by bending the edges thereof along the dotted lines shown in Figure 5 and placed in the lower part of opening 26 by gluing or otherwise securing the bent edges to the walls forming said opening, said flap 45 having a handle 47 attached thereto.

An eraser or wiper having a back 48 and a wiper material 49 attached thereto is adapted to be placed into pocket 27.

A plate 50 is set in the rear frame 11 and carries a book or paper shelf composed of a plurality of substantially vertical bars 51 and longitudinally extending cross plates 52 allowing a convenient insertion of sheets or drawing cards 53 or the like into the shelf.

A plate or table 54 in a frame 55 is on its upper face velvet finished to form a desk plate while its other side forms the slate. In its position as desk plate the side edges of the plate 54 rest on brackets 56 having an upper shoulder 57 engaging a pin 58 projecting from the front face of the legs to frame 10.

The brackets 56 serve also as supports for the lower edge of the table when the plate 54 is turned to present the slate to the front, while during the folding of the easel the same is entering a longitudinal slot 59 in the rear legs of frame 11.

The buttons 39 bearing the cardinal numbers or letters of the alphabet are double headed and have each of their inner edges chambered as at 60 and a comparatively thin connecting shank 61 facilitating the free movements of the buttons in the passageways.

The operation of my device will be entirely clear from the above description and simultaneous inspection of the drawings, and it will be evident that the easel can be conveniently set up and folded by spreading the frames, and the device will then be ready for use with the double headed buttons freely movable in their passageways to form words and legends for reading and spelling purposes or for addition, subtraction and multiplication or other counting purposes entertaining and keeping the attention of the child, while the illustrations furnish an unlimited number of printing and drawing lessons or assist in lectures.

The specific construction of the turn or curve leading from the parallel straight line channel will meet the outer oval or circular channel at nearly a right angle and will allow the blocks or buttons to pass in or out of the curve without locking.

The chalk pocket and erasers are always handy and allow a safe storing away after use while the shelf or handy rack holds sets of drawing cards. The frame bars, chalk pocket, and fancy eraser are enameled in contrasting colors to present a highly embellished device pleasing to the eyes of the observer, while the plate has on one side velvet finish for use as a desk plate on top, while its other side forms the slate which can readily be set up for use as such and which can easily be stored in the slots of the legs when the easel is folded.

It is to be understood that I have disclosed the preferred form of my device as one example of the many possible ways to practically construct the same and that I may make such changes in the general arrangement thereof and in the construction of its minor details as come within the scope of the appended claims without departure from my invention and the principles involved.

Having thus described my invention, what I claim as new and desire to secure by Letters Patent is:

1. In an easel blackboard of the class described, members forming guide channels for buttons between themselves and an outer channeled member, the outer ends of the inner of said members turned or curved, the turn or curve leading from the guide channels between said inner and the outer members meeting the outer oval channel at approximately a right angle allowing the buttons to pass in or out of the curve without locking.

2. In an easel blackboard of the class described, a plate having a median oval opening, a base for said plate, the edges of said plate projecting beyond said base and surrounding said opening, filler members, rear cleats on said members allowing a pasting of said filler members to said plate within said opening, two of said members constituting outer members having curved outer edges and straight inner edges, and two other of said members constituting inner or central members having straight side edges forming with the straight inner edges of said outer members and with their inner parallel side edges channels, rounded shoulders formed with the inner upper end edges of the central members and the lower end edges of said outer members to form outlets for said channels for allowing the passage of blocks in and out of the channels avoiding locking and allowing a smooth and rapid movement of said blocks in and out of said channels.

3. In an easel blackboard as described, a member provided with an oval opening, a base therefor, said member having the edge forming said oval opening projecting beyond its base, and a plurality of intermediate members, bases for said members, the edges of said members projecting beyond their bases to form straight channels with each other and a curved channel between the outer of said members and said member having the oval opening for the guidance of buttons, the outer ends of the inner of said members turned or curved, the turn or curve from the straight channels between the inner of said members meeting the outer curved channel at a right angle allowing the buttons to pass in or out of the curve without locking.

Signed at Troy, in the county of Miami and State of Ohio, this 31st day of March, A. D. 1930.

HORATIO G. CRESS.